UNITED STATES PATENT OFFICE.

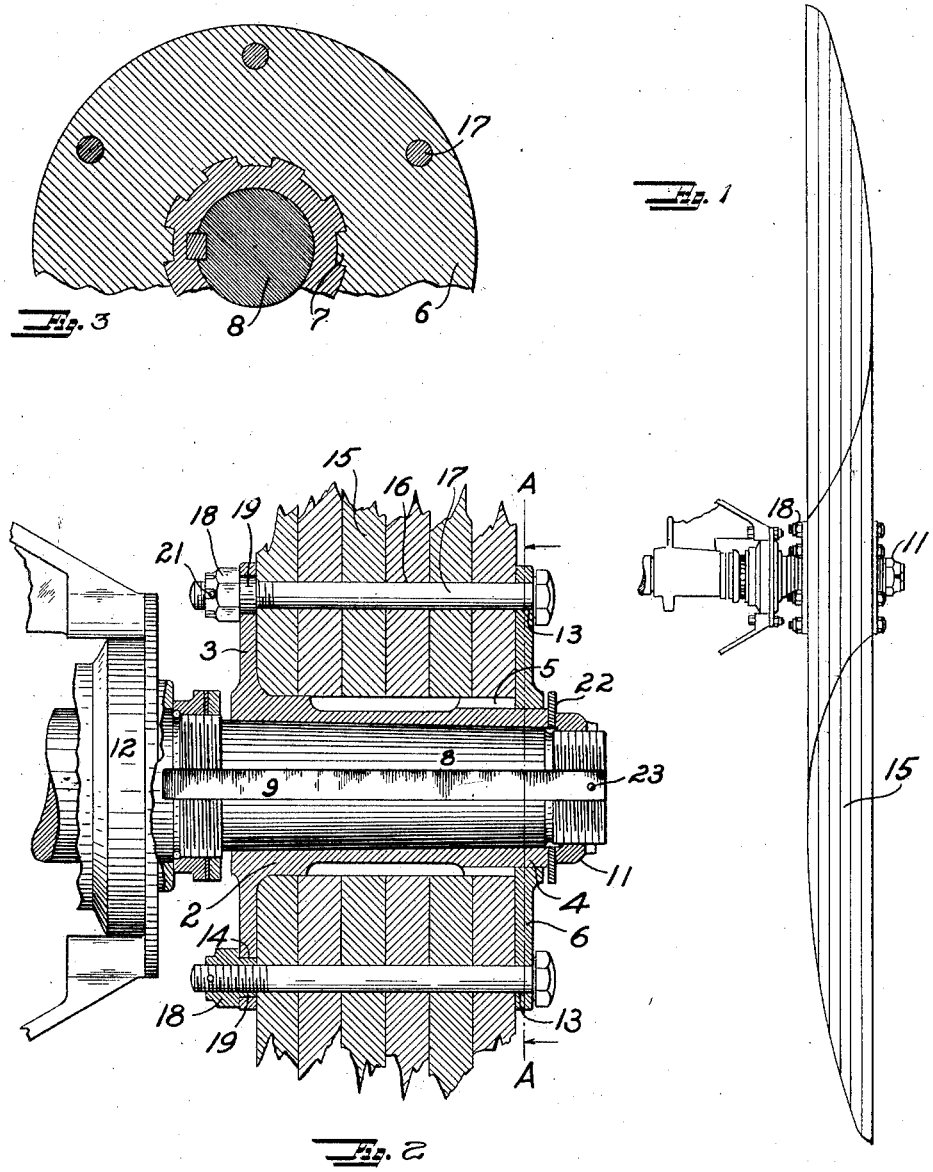

ELBERT J. HALL, OF BERKELEY, CALIFORNIA.

PROPELLER-MOUNTING.

1,349,758.  Specification of Letters Patent.  Patented Aug. 17, 1920.

Application filed December 28, 1915. Serial No. 69,085.

*To all whom it may concern:*

Be it known that I, ELBERT J. HALL, a citizen of the United States, and a resident of Berkeley, county of Alameda, State of California, have invented a new and useful Propeller-Mounting, of which the following is a specification.

My invention relates to a mounting for an aeroplane propeller.

The object of my invention is to provide an improved mounting for aeroplane propellers.

The invention possesses other advantageous features, which, with the foregoing, will be set forth in the following description, where I shall explain that preferred form of my invention which is illustrated in the drawings accompanying and forming part of the specification. The novelty of the invention will be included in the claims succeeding said description. It is to be understood that I do not limit myself to the showing made by the said drawings and description, as I may adopt other variations within the scope of my invention as set forth in the said claims.

Referring to the drawings:

Figure 1 is a view showing an aeroplane propeller mounted according to my invention.

Fig. 2 is a sectional view through the propeller and mounting on an enlarged scale, portions of the figure being broken away.

Fig. 3 is a sectional view of a portion of the structure taken on the line A—A of Fig. 2.

In the drawings I have shown my invention as a mounting for an aeroplane propeller; but it is obvious that it may be used as a mounting for rotatable elements other than propellers.

My invention consists of a cylindrical hub 2 having a flange 3 integrally formed therewith. At the end 4 opposite the integral flange, a plurality of grooves 5 are formed in the surface of the hub. A removable flange 6 is arranged to fit upon this end of the hub and is provided with teeth 7 which engage the grooves, so that the flange is effectually prevented from moving revolubly relative to the hub.

The center of the hub is formed to fit tightly upon the end 8 of the driving shaft and relative rotation between the shaft and the hub is prevented by means of a key fitting the key seat 9 in hub and shaft. A nut 11 secures the hub upon the shaft, which extends from the bearing 12 on the engine.

Spaced about the outer portions of both flanges 3 and 6 are bolt holes, the holes 13 in the flange 6 being alined with the holes 14 of flange 3 when the flange is mounted on the hub.

The propeller 15 is apertured at the center to fit snugly over the hub 2 between the two flanges, and holes 16 are drilled through the hub section thereof in alinement with the bolt holes in the flanges. The holes 13 and 16 in the removable flange of the propeller hub and the hub section of the propeller body respectively, are formed to give a tight fit for the bolts 17 which clamp the propeller between the flanges, but the holes 14 in the flange 3 are made larger than the diameter of the bolt 17, so that when the bolt is passed through the structure to secure the propeller between the flanges, the threads on the bolt end are not injured by contact with the edges of the hole 14. A nut 18 is threaded on the projecting terminal of the bolt to draw the parts together.

Heretofore it has been the practice to allow the threaded bolt terminal to contact with the flange at this point with the result that the threads are usually injured when the bolt is inserted. With the threads in contact with the edges of the hole, a mutually destructive action is begun when the propeller is in operation. This ruins the tight fit which should be maintained and impairs the security of the nut, which must be tightened from time to time to take up the shrinkage and compression in the wood and therefore engages more of the injured threads with each adjustment. This objectionable wear at a vitally important point is avoided in the applicant's invention and the threads of the terminal are preserved intact so that when the nut is tightened uninjured threads are engaged.

A portion of the base of the nut 18 is cut away to form an extended portion 19 upon the body of the nut, and the hole 14 in the flange 3 is accurately sized to this projection. When the nut is screwed into place, the projection 19 enters the hole 14 thus forming a protective bushing between the terminal and flange, so that both the threads of the terminal and the flange are protected from injury by the other during the stresses and vibrations set up in actual use. A cotter pin 21 passing through nut and bolt prevents loosening of the nut 18. When it is necessary to remove the propeller, the nut 18 is unscrewed from the terminal, leaving the hole 14, which is larger than the diameter of the terminal, through which it slips without contact or injury as the propeller and flange 6 are drawn off of the hub.

Means are provided for preventing the loss of the propeller should the bolts 17 fail. On the shaft 8 between the retaining nut 11 and the hub 2 is a ring 22 of a diameter such that it overlies the removable flange 6, and effectually prevents the flange 6 or the propeller from dropping off of the shaft even should all the bolts fail. A cotter pin 23 passing through the nut 11 and the shaft 8 prevents accidental loosening of the nut.

I claim:

1. A mounting for an aeroplane propeller comprising, in combination, a hub having a fixed flange and a removable flange each of said flanges being provided with a plurality of circumferentially disposed holes, the holes in said fixed flange being materially larger than those in said removable flange, an air screw arranged upon said hub between said flanges, a plurality of bolts passing through the said flanges and through said air screw, said bolts forming a tight drive fit in said air screw and clearing the edges of the holes in said fixed flange, and a nut on each of said bolts having an extension adapted to bush the bolt in the fixed flange, said nut and extension being adapted to be unscrewed from the bolt whereby the air screw with the bolts therein may be withdrawn bodily from said fixed flange.

2. In a mounting for an aeroplane propeller, the combination with a drive shaft, of a flanged hub secured thereto, said flange being provided with a plurality of circumferentially disposed holes, an air screw mounted on said hub, a second flange secured to the hub and engaging the outer face of the air screw, bolts of materially smaller diameter than said holes extending through said air screw and flanges and forming a tight fit with said air screw, rotatable nuts on the inner ends of said bolts and extensions on said nuts surrounding said bolts and forming tight fits in said holes.

3. An air screw mounting comprising a flange having an opening therein, a bolt of less size than said opening for securing the air screw to said flange, said bolt extending through said opening, and a nut on said bolt adapted to be independently removed therefrom and provided with an extension forming a bushing for the bolt in said flange.

4. An air screw mounting comprising a hub having a fixed flange and a removable flange, a bolt passing through openings in said flanges, the opening in the fixed flange being considerably larger than said bolt, and a nut on said bolt forming a bushing between the bolt and the fixed flange, said bushing being adapted to be unscrewed from the bolt whereby the bolt may be withdrawn from said fixed flange.

5. An air screw mounting comprising a hub having a fixed flange, a removable flange having means thereon for preventing relative rotation between it and the hub, said flanges having openings, a bolt passing through said opening and a nut on said bolt adapted to be independently removed therefrom and provided with an extension forming a bushing for the bolt in one of said flanges.

In testimony whereof I have hereunto set my hand at San Francisco, California, this 23rd day of December, 1915.

ELBERT J. HALL.

In presence of—
H. G. PROST.